Figure 1:
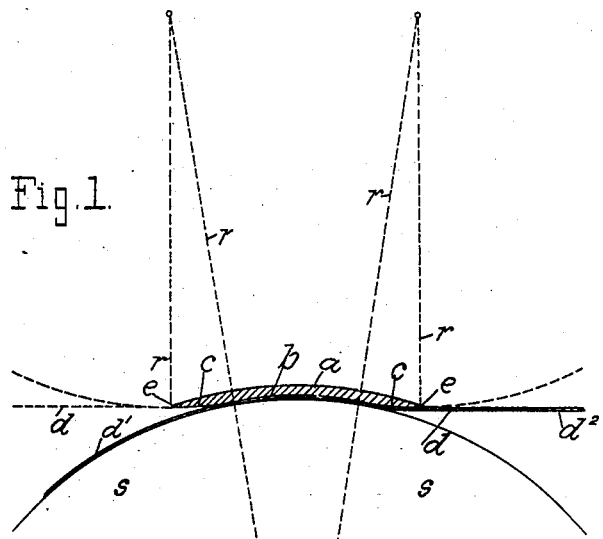

No. 894,126. PATENTED JULY 21, 1908.
C. ELOESSER.
MEANS FOR STRENGTHENING METAL BELTS AND FOR CONNECTING THE ENDS THEREOF.
APPLICATION FILED OCT. 11, 1907.

4 SHEETS—SHEET 1.

WITNESSES:

INVENTOR
Carl Eloesser
ATTORNEYS.

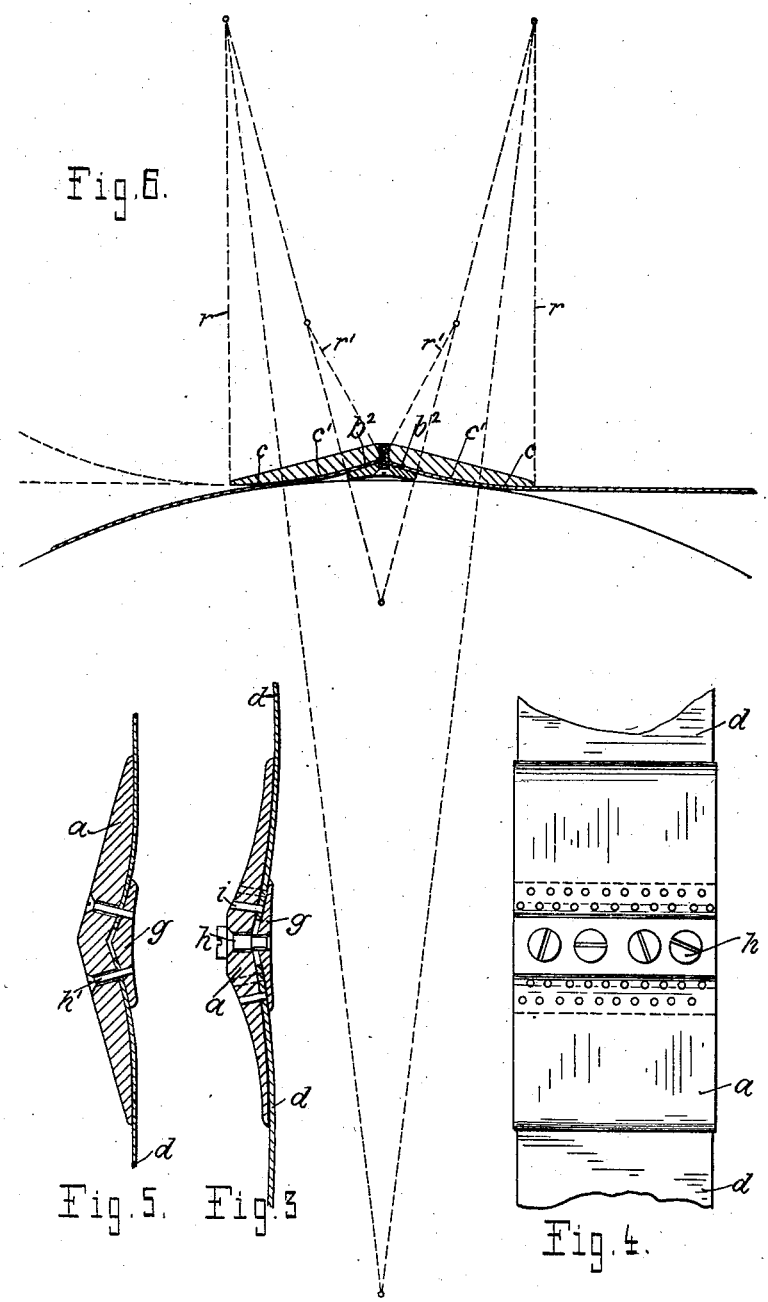

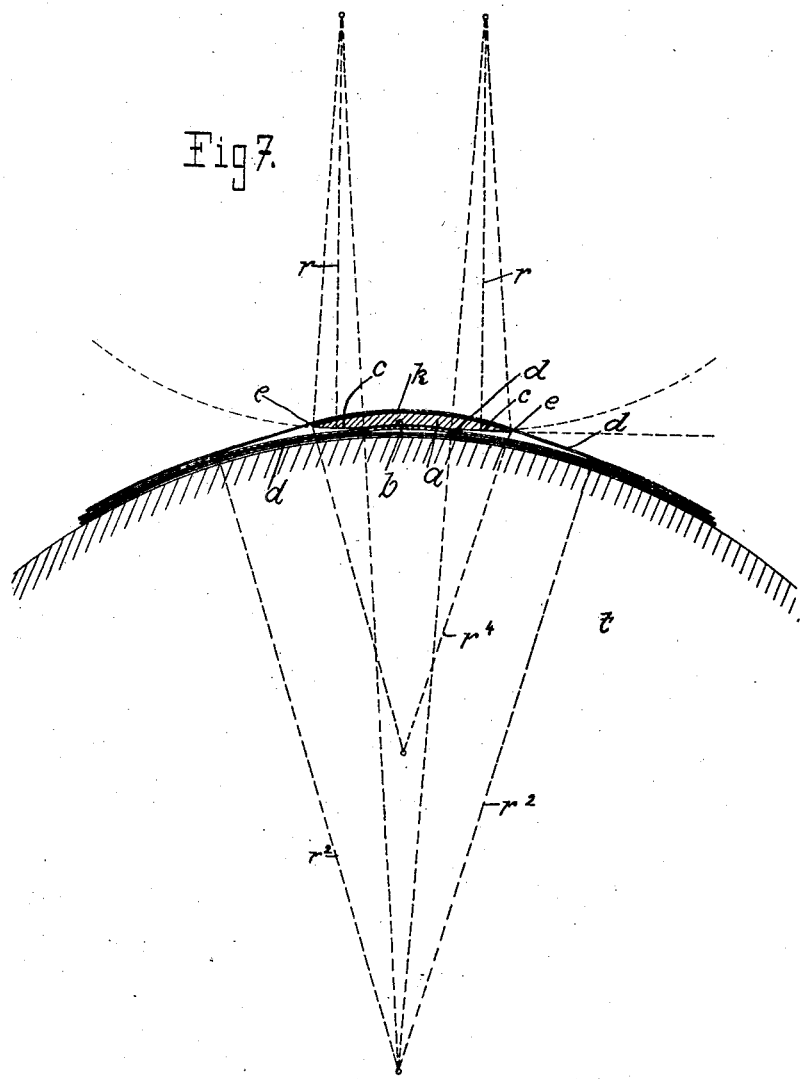

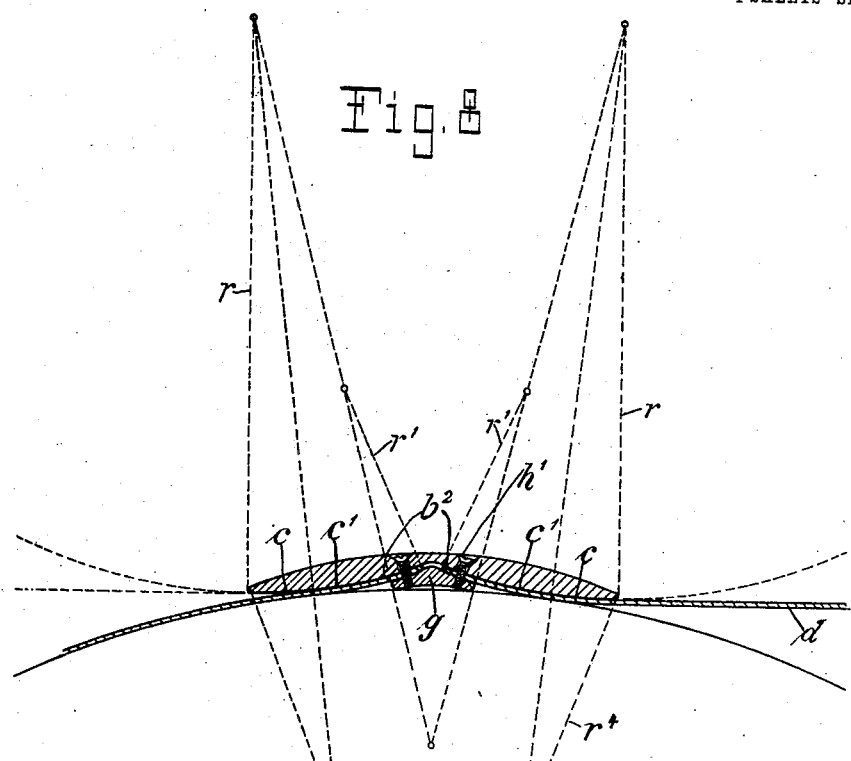

UNITED STATES PATENT OFFICE.

CARL ELOESSER, OF CHARLOTTENBURG, GERMANY.

MEANS FOR STRENGTHENING METAL BELTS AND FOR CONNECTING THE ENDS THEREOF.

No. 894,126.  Specification of Letters Patent.  Patented July 21, 1908.

Original application filed March 4, 1907, Serial No. 360,585. Divided and this application filed October 11, 1907. Serial No. 396,904.

*To all whom it may concern:*

Be it known that I, CARL ELOESSER, a citizen of the Empire of Germany, residing at 37 Hardenbergstrasse, Charlottenburg, Germany, have invented new and useful Improvements in Means for Strengthening Metal Belts and for Connecting the Ends Thereof, of which the following is a specification.

My invention relates to improvements in means for strengthening metal belts and for connecting the ends thereof. And the object of the improvements is to provide a belt strengthening and connecting means which will not produce excessive bending stresses on the metal bands when passing over a pulley. For this purpose the said strengthening and connecting means consist of a piece of metal which at both its ends is provided with riding off surfaces the radii of curvature of which are so large that the bending stresses of the band remain within the limit of safety.

My improved strengthening and connecting means are particularly designed for use in combination with metal belts described in a previous application for patent Ser. No. 360,585, of which this application is a division. In the specification of the said original application the principles have been set forth which must be observed in constructing metal belts, which principles must also be regarded when choosing the proper dimensions of the riding off surfaces of the strengthening or connecting pieces. And broadly stated it has been shown that, in order to obtain a metal belt which does not break after a comparatively short time of use, the ratio of the thickness of said metal belt to the diameter of the curvature to which the same is subjected must not be less than one half the ratio of the measure of the limit of fracture of the weakest part of the band to the modulus of elasticity of the material thereof, when said limit of fracture and modulus of elasticity are both expressed in the same units. For further information relating to this principle and to certain modifications thereof that apply under certain circumstances reference may be had to the said original application.

Now, as regards the invention described hereinafter, it will readily be understood, that the same principle applies where it is desired to determine the proper curvature for a metal belt of a given dimension, and that, therefore, for a certain belt the proper dimension of the strengthening or connecting pieces may readily be ascertained.

Now, for the purpose of explaining the invention, I have shown several examples of strengthening or connecting pieces embodying the invention in the accompanying drawings, in which Figure 1, is a diagrammatical view of a part of a pulley, a metal belt, and of a strengthening or connecting piece, Figs. 2 to 6, are similar views of modifications of the strengthening or connecting piece, Fig. 4 being a plan of Fig. 3, and Figs. 7 and 8 are similar views of a belt intended to be used in hoists.

The same letters of reference have been used to indicate corresponding parts in all the views.

The strengthening pieces referred to above will be particularly useful, where the ends of the metal belt have been united by soldering or welding in which case the joint has not the strength of the remaining part of the belt. Or the ends of the belt may be united by means of a connecting piece without soldering or welding the same. Under any circumstances, when using a strengthening or connecting piece as described, it is essential for insuring durability that the rigid piece, which is secured to the band, be provided at its ends with extension surfaces of suitable curvature, from which the metal band will be able to ride off on transition from the circular path around the pulley to the straight path. Bands fitted with known fastenings are subjected to rapid deterioration, because the band consequently, on transition into the straight part of its path, is subjected, at the extremity of the fastening, to an abrupt change of direction causing a fold or crease. This sets up bending stresses of such intensity that no metal band could withstand them. This defect is avoided according to the present invention by providing the rigid piece with riding off surfaces and prolonging the latter to the point where the band transits to the straight path, the prolonged portion having, in all points, so great a radius of curvature, that only admissible bending stresses will occur, which large radius also exists at the extremity, where the band leaves the rigid piece in a tangential direction. With such a configuration, a crease in the band will be avoided.

In the example shown in Fig. 1, which represents the conditions when the strengthening piece is passing around the pulley $s$ the rigid member of the band consists of a metal plate $a$, the concave surface $b$ of which is of somewhat less radius of curvature than that of the smallest pulley of the gear, so that on running around the pulleys the rigid member will always bear thereon along two lines. Extending from this curved portion $b$ on each side with gradual transition of curvature is an outwardly directed portion with counter curvature $c$. The metal band $d$ is brazed or welded, or otherwise secured to the concave surface; if the rigid member acts as a fastening, the two ends of the band are butted together at the center of the concave surface $b$. The band is not secured to the counter curvatures $c$, but gradually lifts therefrom, when passing from the straight path $d^2$ (shown on the right) into the circular path $d^1$ around the pulley (shown on the left) and vice versa it rides off the counter curved surfaces when it passes from the circular to the straight path. The radius of curvature $r$ of these counter surfaces $c$ must not be too small, in order that the bending stress of the band wrapping same shall not become too great; if it be smaller than the radius of the smallest pulley, as may be possible, the thickness of the metal band must be calculated with reference to this radius of curvature, in such a manner that the greatest bending stress in no case attains half the limit of fracture. In such a case, when calculating the most suitable value, regard must be paid to the fact that the metal band when a fortifying member is employed will be subjected to bending stresses alternately in two different directions. The characteristic feature of this part of the invention consists in providing a large radius of curvature $r$ at the extremities $e$, where the band leaves the counter curvatures and the rigid member to become straight generally in a line which is tangential to the curvature $c$, the radius at $e$ being therefore perpendicular to the straight path of the band. The two radii of curvature $r$ at the riding-off extremities $e$ of the band are therefore parallel to each other.

Figure 2:
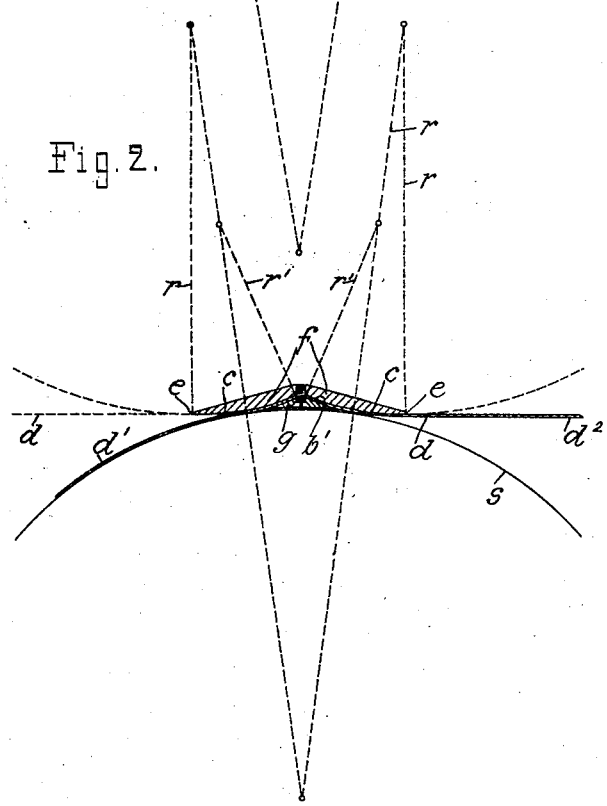

In the example shown in Fig. 2 the fortifying piece, or fastening as the case may be, consists of two parts $f\ g$, between which the band $d$ is interposed or alternatively the ends of the band are inserted and secured. The total contacting surface of the parts $f\ g$, to which the band is secured, is so shaped that the curved surface $b^1$ gradually merges into the riding-off surfaces $c$. The portion $b^1$ may be of sharper curvature than the riding-off surfaces, as the bending action to which the band is subjected by the contact of this surface is permanent and is not repeated. The radius of curvature $r^1$ of the surface $b^1$ may be about one half to one third of that of the radius of curvature $r$ of the riding-off surfaces. The latter surfaces should, according to this invention, be extended at least so far, that the radii $r$ at the extremities are parallel to each other. This method of construction is preferable to that of Fig. 1 because it leads to a shorter length for the reason that the brazing on of the band will be sufficiently secure, if it is effected for a short length only. Loosening of the screw connection between the two parts of the fastening can be prevented by inserting the screw or screws, while the spelter with which the band is brazed is still fluid. The solidified spelter will form a complete lock for the screws, which (by heating) can be unlocked. If the rigid piece, according to Fig. 2 is used as a band fastening and the band is secured to the fastening by soft soldering, the following process is advantageously employed: First the ends of the band and the portions of the fastening are coated with the solder. Then the ends of the band and the inner portion of the fastening are secured to a rule in correct relative position, after which the outer portion is fastened tightly by means of the screws, then the fastening is carefully heated externally, till the solder flows after which the screws are tightened and the whole immediately cooled. In this process the band must previously have been passed around the shafts so that merely the mounting on to the pulleys by means of a mounting cone, will be required to be effected. It is possible to so divide the fastenings that they are adjustable (e. g. by screws with right and left handed threads or by interchangeable plates), in order to permit a subsequent adjustment of tension.

In the examples shown in Figs. 3 to 5 the ends of the band are united to the fastening in a special manner. If with such a kind of fastening the band were to be riveted to the back of the fastening, then in consequence of the crushing pressure of the rivets in the rivet holes fracture extending from the inner surfaces of the rivet holes, is liable to occur as has been demonstrated in practice. The present invention is adapted to avoid this cause of weakness by arranging for the tension of the ends of the metal band to be transmitted to the fastening by pins, which occupy corresponding holes in the band, without exerting a pressure on the surfaces of the holes. These pins are preferably secured firmly in one portion of the fastening. The pins thereby simply prevent the movement of the band perpendicularly to their axes, while the connection of the band with the fastening in the axial direction of the pins i. e. the prevention of the falling off of the band is effected by other means, e. g. by soldering or by clamping the band.

A specially suitable and secure method of the indicated kind for connecting fastenings composed of an inner plate and an outer back plate is to form the pins as screws which unite the outer and inner portions of the fastenings and which penetrate the mass of solder in which the ends of the band are embedded between the two portions of the fastening, it being preferable to tighten the screws before the solder sets. This fastening not only provides the advantage of double security against the band tearing out, but also affords to the entire fastening an increased rigidity and strength in view of the solid connection of the two portions, so that it can be made thinner than with other means of fastening such a band, employed under like circumstances.

Fig. 3 shows in section a two-part fastening, in which the band transmits the tension to the fastening by pins, and Fig. 4 shows a plan view of the back portion. The fastening consists of a back portion $a$ which is provided with suitable riding-off surfaces for the band $d$, when passing to the straight from the circular path, and an inner portion $g$, which is united by screws $h$ in the middle to the back $a$, after the ends $d$ of the band have been placed in position. In the back $a$ to the right and left of the middle row of screws $h$ two rows of pins $i$ of small diameter are securely inserted, which pins project slightly beneath and engage in corresponding holes in the ends of the band, completely filling same without constraint.

The fastening is effected as follows: The ends of the band are placed with their holes on the ends of the pins $i$, the inner portion $g$ is then placed in position and tightened by the screws $h$, preferably after the space between the two portions of the fastening has been filled with solder and while this latter is still fluid.

Fig. 5 shows a further example, in which the pins $i$ and screws $h$ are combined. In this example therefore, the parts $a$ and $g$ of the fastening are held together by screws $h^1$ which fit holes in the ends $d$ of the band, the holes of the inner part $g$ being preferably tapped. In this merely one row of screws is sufficient for each end of the band. If this fastening be effected while the solder, still fluid, occupies the intermediate space, an especially secure and solid fastening is provided. The solder completely fills the holes in the ends of the band and occupies the spaces between the threads of the screws $h^1$, so that the screws act exactly the same as pins and merely evoke non-prejudicial shearing stresses in the metal band.

Instead of the headed screws shown, studscrews provided with loose nuts could be employed, in which case the lower portion of the fastening may be unnecessary.

Instead of transmitting the tension by means of the pins the band surface can be welded to the back piece of the fastening along a row of points, usually by electric heating.

Fig. 6 shows an example of a fastening device, which is an improvement on those of Figs. 1 and 2. In the fastening devices shown in Figs. 1 and 2, the curvature along which the band end is secured to the rigid portion of the fastening merges directly into the riding-off curvature $c$, along which the band bears during its straight travel and which it leaves on traversing the pulley. It has been proved that it is advantageous to include a safety curvature between these two curvatures, as it may arise that the band, in consequence of vibration or other causes, may lift further away from the fastening than corresponds with the riding-off surface. This safety curve must not have the same small radius as the clamping curve, as the alternating flexure of the band at this part would be too abrupt and may lead to fracture if such flexure were frequently repeated. Preferably the radius should be made quite as great as that of the riding-off curves. The form shown in the figure embodies these features in which $b^2$ is the clamping curve, $c$ the normal riding-off curve and $c^1$ the safety curve. $r^1$ is the radius of the clamping curve and $r$ that of the riding-off and safety curves.

In Fig. 7 I have shown a strengthening or connecting piece used in combination with a belt adapted for use in hoists. If with hoist bands a rigid fastening device is to be employed for joining the ends of the band, or a rigid strengthening piece is required to be employed, in a manner similar to that described previously with reference to Figs. 1 to 6 for endless bands, a special configuration must be given to the back of the fastening, having regard to the fact that, when the band is wound on a drum, the fastening will be wound with it and the succeeding layer will wrap the back of the fastening and have to conform to its shape. Should the shape of the back of the fastening be unsuitable, it will be possible that a band which is compelled to adapt itself to the back of the fastening, will be exposed to great bending stresses and especially when subjected very frequently to such stresses it will break. Consequently with such bands the inner side to which the ends of the band are secured, and also the outer side, which forms the back of the fastening, should be formed with graduated curvatures in order to avoid fracture of the band by abrupt bending. Fig. 7 illustrates a suitable configuration for such fastenings for hoist bands. The ends of the band $d$ are secured to the inner surface $b$ in a suitable manner, as previously described with reference to endless bands. The inner surface has preferably a radius of curvature somewhat less than the radius $r^2$ of the drum $t$. Extending from the concavity $b$ on both sides are the above described convex riding-off curves c with radii r. The back k on the one hand must not be curved too sharply because the band on winding onto the drum over the back of the fastening would be unduly bent and would consequently have to be made unnecessarily thin and broad. On the other hand the back must not be too flat, as in that case the band d which lies over the back, on passing off the end thereof onto the drum would be liable to become abruptly bent. A suitable radius of curvature for the back has been proved to be $r^4$, which corresponds to about half the radius $r^2$ of the drum. With this radius the back surface k will be a little longer than the inner surface, which need only extend to the parallel radii r. The latter surface however can be extended without prejudice as far as the extremities e, e of the back of the fastening, at which the band runs tangentially to the periphery of the drum.

As stated before, the strengthening or connecting piece described with reference to Fig. 7 may have the form of the strengthening or connecting pieces shown in Figs. 1 to 6. Now, in Fig. 8 I have shown an example of a connecting or strengthening piece embodying the characteristic features of the pieces shown in Figs. 5, 6 and 7. The reference numerals used in the said figure are the same as those indicating the corresponding parts in Figs. 5, 6 and 7 and the said figure will be understood by reference to the description of Figs. 5 to 7.

Having thus described my invention, I claim as new and desire to secure by Letters Patent:

1. In a belt-gearing, the combination with a pulley, of a metal band wrapped around said pulley, and a rigid piece fitted on said band and provided with outwardly curved riding-off surfaces, the radius of curvature of said riding-off surfaces being sufficiently large for the bending stresses of the band when riding off to become straight to remain within the limit of safety.

2. In a belt-gearing, the combination with a pulley, of a metal band wrapped around said pulley, an outer rigid piece fitted on said band and having a middle curved portion of a radius of curvature which is smaller than that of the pulley and provided with outwardly curved riding-off surfaces, the radius of curvature of said riding-off surfaces being sufficiently large for the bending stresses of the band when riding off to become straight to remain within the limit of safety, and an inner piece located at the curved middle portion and inclosing, with said outer piece, said band.

3. In a belt-gearing, the combination with a pulley, of a metal band wrapped around said pulley, an outer rigid piece fitted on said band and having a middle curved portion of a radius of curvature which is smaller than that of the pulley and provided with outwardly curved riding-off surfaces, the radius of curvature of said riding-off surfaces being sufficiently large for the bending stresses of the band when riding off to become straight to remain within the limit of safety, and an inner piece located at the curved middle portion and inclosing with said outer piece said band, screws passing through said inner and outer pieces and the metal band, and solder joining said outer piece and band and extending within the screw holes.

4. In a belt-gearing, the combination with a pulley, of a metal band wrapped around said pulley, and a rigid piece fitted on said band and provided with outwardly curved riding-off surfaces, the radius of curvature of said riding-off surfaces being so selected that the bending stresses remain below half the limit of fracture.

5. In a belt-gearing, the combination with a pulley, of a metal band wrapped around said pulley, a rigid outer and inner piece fitted on said band on opposite sides thereof and joining two ends thereof, and clamping screws passing with a close fit through said outer piece and band so as to take up the longitudinal stresses of said band and screwed into the inner piece, so as to clamp said inner and outer piece and said band together.

6. In a belt-gearing, the combination with a pulley, of a metal band wrapped around said pulley, and a rigid piece secured on said band and having its outer surface curved so that when wound on a drum no crease will be formed in the portion superposed on the fastening device.

In testimony, that I claim the foregoing as my invention, I have signed my name in presence of two subscribing witnesses.

CARL ELOESSER.

Witnesses:
 HENRY HASPER,
 WOLDEMAR HAUPT.